United States Patent

Parisi

[11] Patent Number: 4,626,162
[45] Date of Patent: Dec. 2, 1986

[54] EXTENDABLE TRAILER FOR MARINE VEHICLES

[76] Inventor: Vincent Parisi, 3464 Germantown Pike, Collegeville, Pa. 19426

[21] Appl. No.: 767,560

[22] Filed: Aug. 20, 1985

[51] Int. Cl.⁴ ............................................. B60P 3/10
[52] U.S. Cl. .................................. 414/479; 280/414.1; 414/477
[58] Field of Search .............. 414/477, 536, 478, 479, 414/483, 494, 498, 532, 538, 500, 484; 280/414.1, 482, 491 A

[56] References Cited

U.S. PATENT DOCUMENTS

| | | | |
|---|---|---|---|
| 2,485,793 | 10/1949 | Vassar | 414/477 |
| 2,700,480 | 1/1955 | Triplett | 280/414.1 |
| 2,830,717 | 4/1958 | Posey | 414/500 X |
| 2,917,194 | 12/1959 | Streater | 414/500 |
| 3,097,755 | 7/1963 | Fulcher | 414/478 |
| 3,140,003 | 7/1964 | Horner | 414/483 X |
| 3,199,695 | 8/1965 | Scofield, Jr. | 414/479 |
| 3,690,490 | 9/1972 | Hall | 414/477 |
| 3,826,391 | 7/1974 | Prince | 414/477 |
| 4,232,990 | 11/1980 | Pierce | 414/559 |
| 4,286,906 | 9/1981 | Robertson | 414/477 |

*Primary Examiner*—Robert J. Spar
*Assistant Examiner*—Stuart J. Millman
*Attorney, Agent, or Firm*—Caesar, Rivise, Bernstein, Cohen & Pokotilow

[57] ABSTRACT

An extendable boat trailer has a wheeled chassis adapted to be secured to a towing vehicle, and a boat supporting cradle movable rearwardly and forwardly on the chassis. The cradle includes a rear section which is engaged by a low friction conveyor in the form of rollers on the chassis for guiding the rearward and forward movement on the chassis, and a forward section extending upwardly and forwardly relative to the rear section. The forward section includes retaining members thereon that are cooperable with rollers on the chassis for engaging the rollers on the chassis when the cradle has been fully extended. A removable towing hitch is separable from the trailer, and the trailer includes only one winch.

6 Claims, 11 Drawing Figures

EXTENDABLE TRAILER FOR MARINE VEHICLES

BACKGROUND OF THE INVENTION

This invention relates generally to a trailer for marine vehicles adapted to be conveyed by a towing vehicle, and more specifically to an extendable trailer for such vehicles.

Extendable boat trailers of the type including a boat-supporting carriage movable on a wheeled trailer frame or chassis are known in the prior art, as evidenced by U.S. Pat. Nos. 3,138,271 (De Lay et al.); 3,140,003 (Horner); 3,826,391 (Prince); 4,050,595 (Bussard) and 4,365,923 (Lubbers).

The trailer disclosed in the De Lay et al. patent includes a boat-supporting platform which is designed to be slid relative to the chassis of the trailer. A review of this patent shows that it does not overcome one of the primary problems associated with the use of conventional trailers; namely, maintaining the wheels of the trailer out of the water to thereby avoid the corrosive effects of the water on the trailer. In the De Lay et al. construction a movable link member 184 is employed to assist in preventing separation of the platform from the chassis, after the platform has been fully extended.

The Bussard patent (U.S. Pat. No. 4,050,595) discloses an extendable trailer employing a primary winch 24 and an additional winch 40. The winch 40 is employed to positively extend a movable trailer accessory 30 outwardly, by rotation in one direction, and inwardly, by rotation in an opposite direction. To achieve this mode of operation opposite ends of a winch cable associated with the drum 40 are attached at 45 and 47 to a strut 46 of the trailer accessory 30. The primary winch 24 is employed to lock the boat 22 to the trailer bed through a winch cable 28 and connecting bolt 29.

The patent to Lubbers (U.S. Pat. No. 4,365,923) discloses a combination trailer/launcher for boats or other marine vehicles. This trailer employes an inner structure 27 which is movable rearwardly to launch the boat, and this inner structure includes front guide bars and rear guide bars that assume predetermined separate inclinations for launching the boat. This trailer, like the Bussard trailer discussed earlier, employs two winch assemblies 15 and 39 in its construction.

The Prince patent (U.S. Pat. No. 3,826,391) discloses a trailer having a plurality of winches in combination with suitable clutch mechanisms for effecting the desired movement of the members of the trailer. One of the winches is employed to tilt the main frame 21 relative to the ground. A second winch is employed, after the main frame has been tilted, to cause a boat support frame 50 to be telescopically extended rearwardly from the main frame. A third winch is employed to draw the support frame back onto the main frame.

The Horner patent (U.S. Pat. No. 3,140,003) discloses a telescopic boat trailer which employs a pair of winches in its operation. One winch 132 is employed to retract and extend an intermediate telescopic member 56, while the other winch is employed to draw the retracted telescopic frame down into the plane of the tow member 30. Thus, the Horner construction, like some of the earlier described trailers, employs a plurality of winches in its construction and operation.

A number of other patents disclose extendable boat trailers in which the boat supporting carriage of the trailer includes ground-engaging wheels, and is movable relative to other trailer elements to effect the boat launching operation. This type of arrangement is disclosed in U.S. Pat. Nos. 2,838,192 (Dzvonik); 2,856,087 (Steber); 2,938,642 (Felix); 3,032,353 (Williams et al.); 3,167,198 (Echler et al.); 3,822,899 (Slack); 3,989,266 (Foster) and 4,232,990 (Pierce).

It also is known to employ movable carriages on a wheeled frame or chassis of a trailer for the purpose of launching a boat from the trailer. Representative patents disclosing this type of arrangement are U.S. Pat. Nos. 3,009,589 (Martz)—carriage member 30 provides the launching function; 3,750,805 (Finney)—dolly 9 provides the launching function; and 3,831,790 (Farris-)—carriage C provides the launching function.

Although some of the extendable trailers may be reasonably suitable for their intended purpose, particularly those trailers employing a boat supporting cradle movable on a wheeled chassis to provide the launching function, and is believed that the need exists for a simpler arrangement which reliably launches the boat, provides relatively few moving parts, and is capable of operating with only a single winch.

OBJECTS OF THE INVENTION

It is a general object of this invention to provide an extendable trailer for boats and other marine vehicles which is simple in construction and extremely reliable in operation.

It is a further object of this invention to provide an extendable trailer for boats and other marine vehicles which reliably launches the boat or vehicle into a body of water, without interference from the extendable portion of the trailer.

It is a further objection of this invention to provide a simple and reliable mechanism for maintaining the extendable portion of the trailer attached to a wheeled chassis thereof, particularly when the extendable portion of the trailer is fully extended.

It is a further object of this invention to provide an extendable boat trailer which is constructed to operate with only a single winch.

It is a further object of this invention to provide an extendable boat trailer which is constructed to minimize the likelihood of theft thereof.

SUMMARY OF THE INVENTION

The above and other objects of this invention are achieved in an extendable boat trailer having a wheeled-chassis adapted to be secured to a towing vehicle at its forward end, and a boat supporting cradle being movable rearwardly and forwardly on the chassis. The cradle includes a generally horizontal rear section and a forward section inclined upwardly and forwardly relative to said rear section. The rear section is movably supported on the chassis through low friction conveyor means, and the forward section includes retaining means thereon cooperable with retaining means on the chassis adjacent the rear end thereof, whereby rearward horizontal movement of the cradle is accompanied by downward movement of the cradle when the horizontal rear section thereof passes beyond a rear edge of the chassis, and said retaining means included on the forward section of the cradle engages the retaining means on the chassis at the end of rearward movement of said cradle.

Reference throughout this application to a "boat" or "boat trailer" includes within its meaning other marine vehicles. and a trailer for such vehicles, respectively.

BRIEF DESCRIPTION OF THE DRAWINGS

Other objects and many of the intended advantages of this invention will be readily appreciated as the same becomes better understood by reference to the following detailed description when considered in connection with the accompanying drawings wherein.

DESCRIPTION OF THE PREFERRED EMBODIMENT OF THE INVENTION

Figure 1:
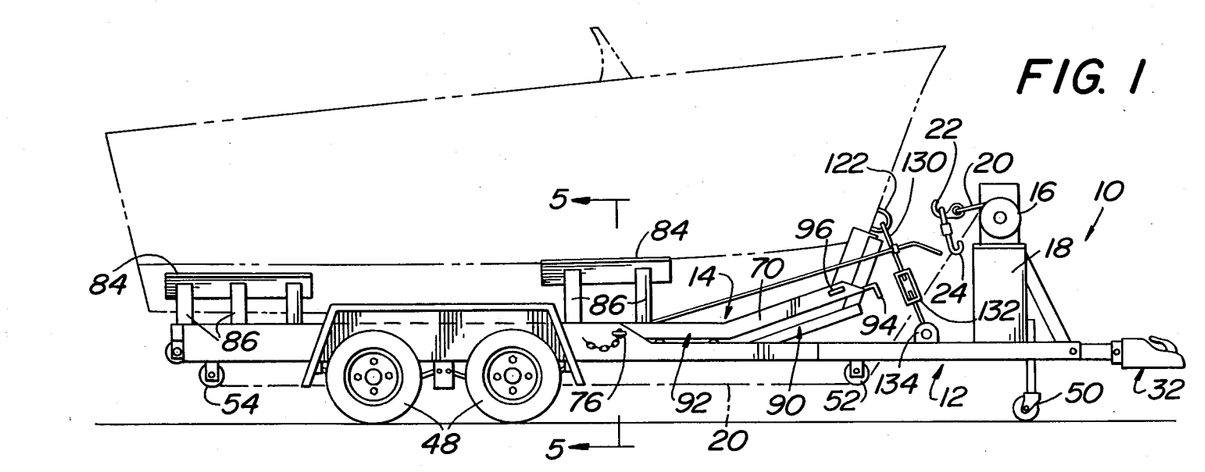
FIG. 1 is a side elevational view of the trailer with a boat, shown in phantom, secured against movement thereon.

Referring now in greater detail to the various figures of the drawings wherein like reference characters refer to like parts, an extendable trailer embodying the present invention is generally shown at 10 in FIG. 1. The trailer 10 basically comprises a wheeled-chassis 12 including a movable boat supporting cradle 14 thereon. In operation the boat supporting cradle is adapted to be moved rearwardly on the chassis for the purpose of launching a boat, and to be moved back onto the chassis to reload the boat on the trailer.

Figures 2, 11:
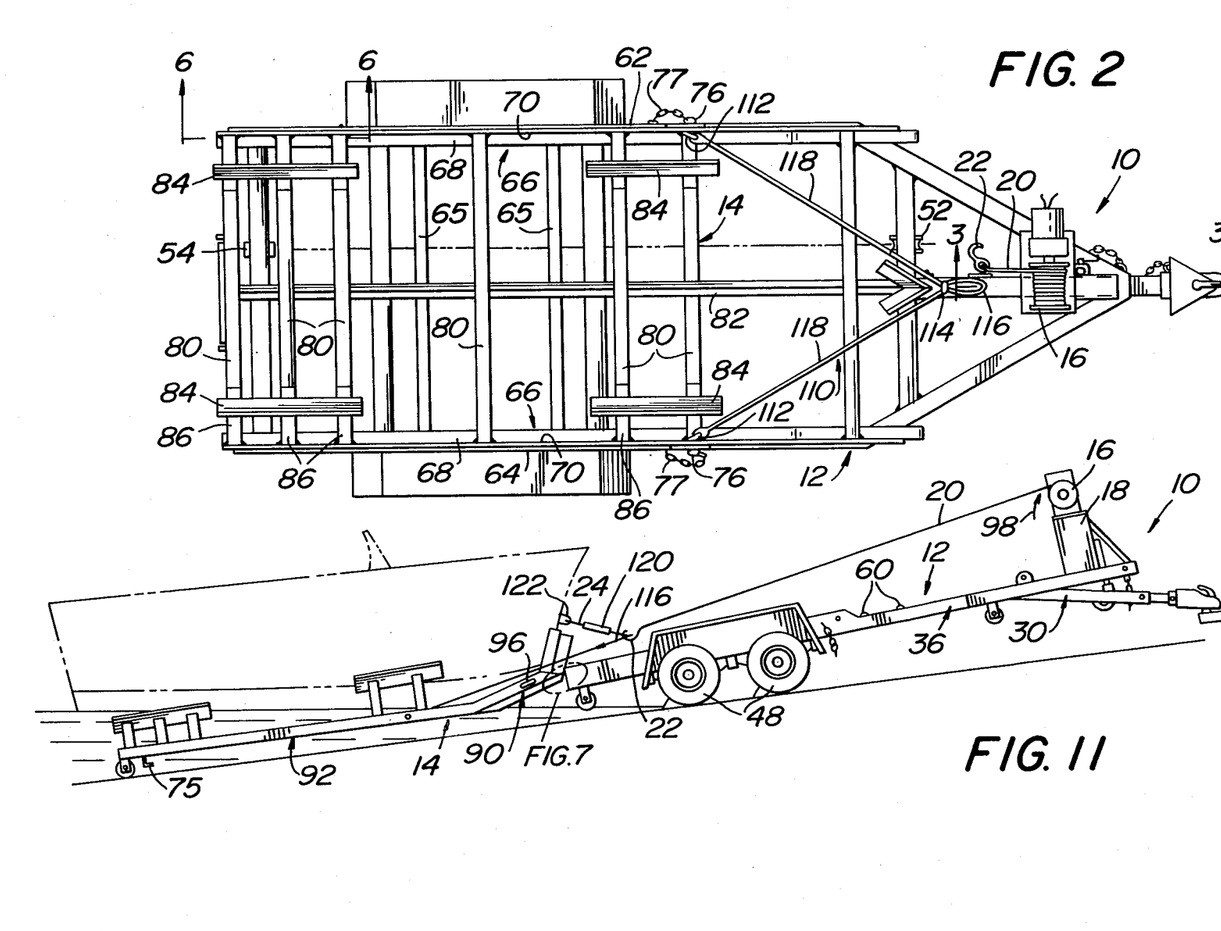
FIG. 2 is a plan view of the extendable trailer of claim 1, with the boat removed to show details of construction.
FIG. 11 is a side elevational view similar to FIG. 10, but showing the manner in which elements are connected for the purpose of directing a previously launched boat back onto the trailer.

As can be seen in a number of the figures, including FIGS. 1 and 2, a power winch 16 of conventional design is connected to the chassis through a support member 18. The winch includes a winch cable 20 having a hook 22 connected to one end thereof. The hook 22 is adapted to engage with members on the movable cradle 14 for the purpose of both extending and retracting the cradle, as will be explained in greater detail hereinafter.

Referring to FIGS. 1 and 11, a second hook 24 is adapted to be removably attached to the first hook 22, and is employed only during the step of loading the boat on the cradle 14, as will be explained in greater detail hereinafter.

Figure 3:
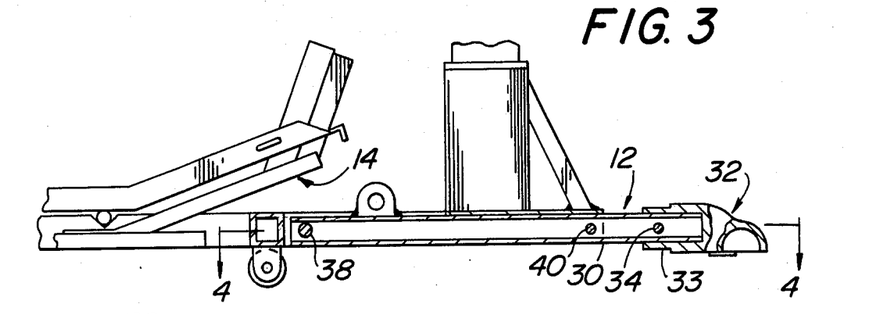
FIG. 3 is a fragmentary side elevational view of the forward section of the trailer.
Figures 4, 7:
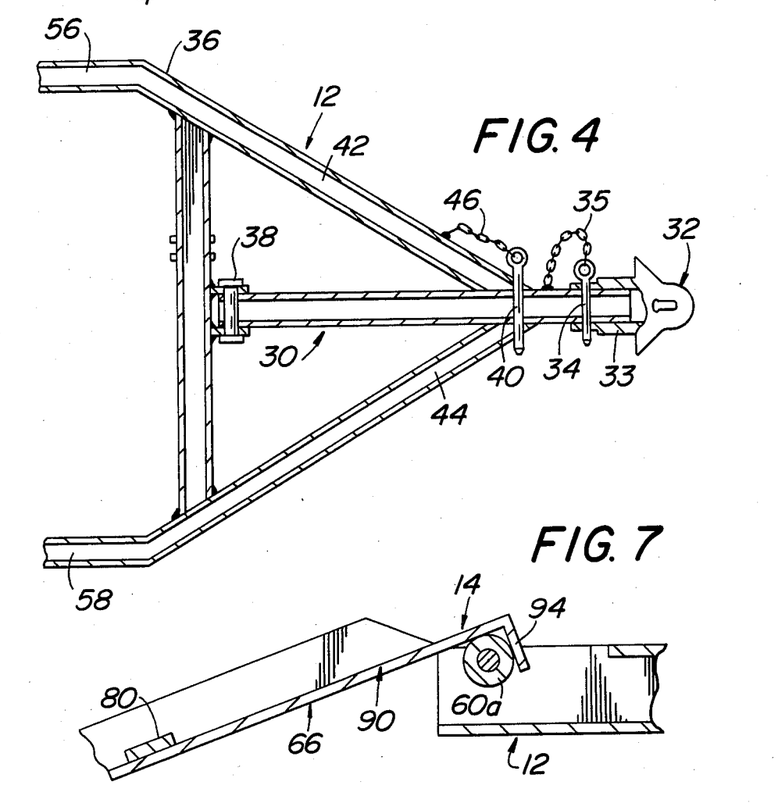
FIG. 4 is a sectional view taken along line 4—4 of FIG. 3.
FIG. 7 is an enlarged fragmentary view of the circled area in FIG. 11, illustrating the manner in which the movable cradle is retained on the wheeled-chassis in its most extended position.

Referring specifically to FIGS. 3 and 4, the chassis 12 includes a forwardly directed tongue 30 having a conventional hitch member 32 removably attached thereto by a locking pin 34. The locking pin connects the hitch 32 to the tongue 30 by extending through aligned openings in the tow bar and a sleeve 33 of the hitch, as can be seen best in FIG. 4. It also should be noted that the locking pin 34 is attached to a link 35 which, in turn, is welded to the tongue to prevent the locking pin 34 from inadvertently becoming separated from the remainder of the chassis.

The removable hitch arrangement is extremely desirable, since its removal from the trailer will prevent, or at least make it difficult for someone to steal the trailer when it is separated from the vehicle.

As can be seen best in FIG. 4, the chassis 12 includes a rearwardly directed main body 36 that is pivotably joined to the tow bar 30 through a pivot member 38. A second locking pin 40 passes through aligned openings in angularly oriented channel sections 42 and 44 of the main body 36 and the tongue 30 to prevent relative rotational movement between the main body and the tow bar, when desired. For example, when the trailer 10 is being towed by a vehicle it is desirable to stabilize all elements so that they do not move relative to each other.

It should be noted that the pin 40 is attached to a link 46 which is welded to the channel section 42. This prevents the pin from becoming inadvertently separated from the chassis 12 in the same manner as described earlier in connection with the locking pin 34.

Figure 9:
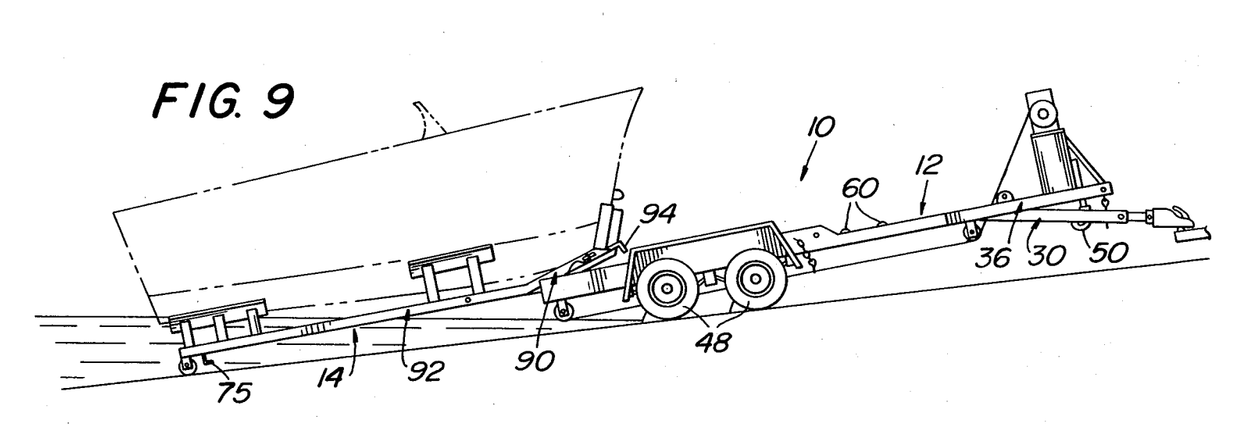
FIG. 9 is a sectional view similar to FIG. 8, and showing the position of the trailer at a later stage of the launching operation.
Figure 10:
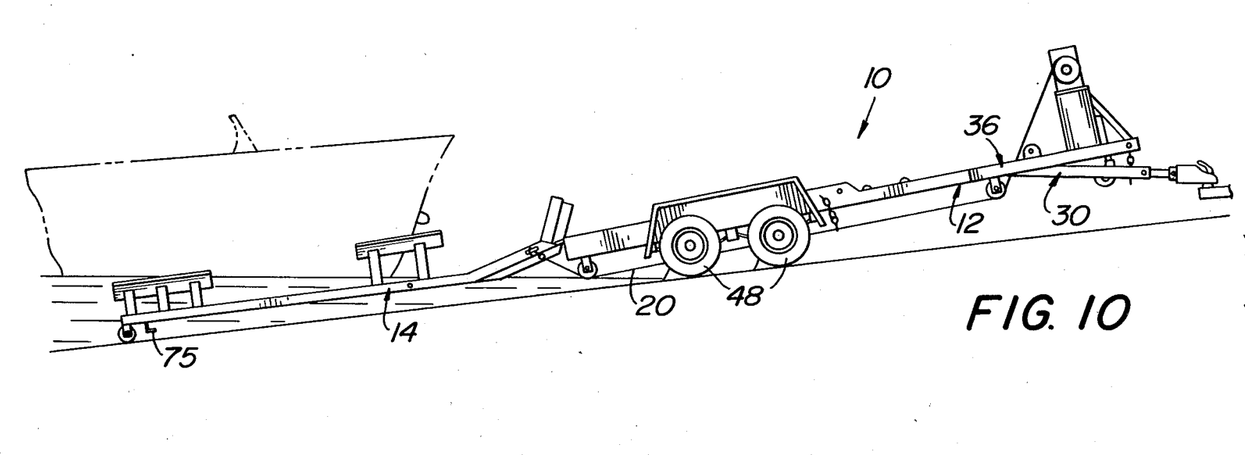
FIG. 10 is a side elevational view similar to FIGS. 8 and 9, and showing a still later stage of the launching operation, with the cradle in its fully extended position.

As can be seen best in FIGS. 9 through 11, the main body 36 of the chassis is adapted to pivot into a downwardly and rearwardly inclined position about pivot member 38 when the center of gravity of the boat and the main body is located rearwardly of the ground engaging wheels 48 of the chassis. Of course, this inclined orientation can only be achieved if the locking pin 40 is removed from its locking orientation relative to the main body 36 and tongue 30. The inclination of the main body 36 assists in the continued rearward movement of the cradle 14 to facilitate launching of a boat carried thereby.

As can be seen best in FIG. 1, the chassis 12 also includes a conventional wheel 50 which is extended to engage the ground and cooperate with the wheels 48 to support the trailer 10 in a horizontal plane when it is unhitched from a towing vehicle. Of course, when the trailer 10 is being towed the wheel 50 is retracted upwardly into a position similar to that illustrated in FIGS. 8 and 11.

Referring to FIGS. 1 and 2, a pair of downwardly extending pulleys 52 and 54 are rotatably attached to the main body 36 of the chassis 12 in a longitudinally spaced-apart relationship, with one of the pulleys 54 being located adjacent the rearward end of said chassis. These pulleys cooperated with the winch cable 20 to assist in positively moving the supporting cradle 14 rearwardly to launch a boat, when needed, in a manner which will be explained in greater detail hereinafter.

Referring to FIGS. 3 through 6, the main body 36 of the chassis 12 includes elongate, generally parallel side channel members 56 and 58 integrally formed with the channel sections 42 and 44. Each of the elongate channel members 56 and 58 includes a plurality of spaced-apart rollers 60 providing a low friction conveyor means for the cradle 14, as can be seen best in FIG. 6. In addition, the rear most roller 60a cooperates with the cradle 14 in a unique and uncomplicated manner for preventing separation of the cradle from the chassis when the cradle is extended into its rearmost position. The manner in which this is accomplished will be explained in greater detail hereinafter.

Figure 5:
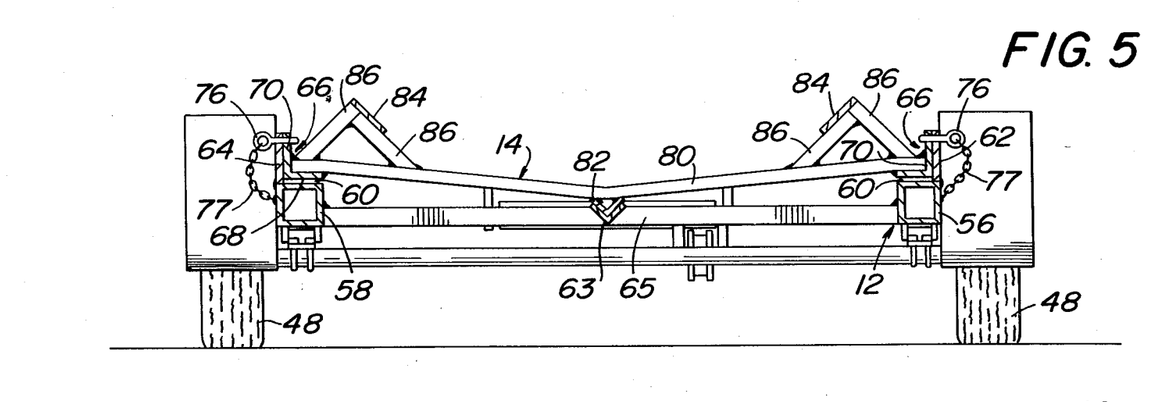
FIG. 5 is a sectional view taken along line 5—5 of FIG. 1.

Referring to FIG. 5, upwardly extending side walls 62 and 64 are welded to each of the side channels 56 and 58, or alternatively, can be formed as a unitary extention of said channels. These side walls assist in maintaining the proper position of the cradle 14 on the chassis 12, and also function to guide the movement of the cradle on said chassis.

Referring specifically to FIGS. 2 and 5, the chassis 12 further includes a longitudinally extending, elongate, V-shaped track 63 which is secured to longitudinally spaced-apart transversely extending cross-braces 65. The cross-braces 65 are attached by any suitable means, such as by welding, to the elongate side channel members 56 and 58. The V-shaped track 63, which is generally centrally located between the side channel members 56 and 58, assists in supporting and guiding the movement of the cradle 14.

Figure 6:
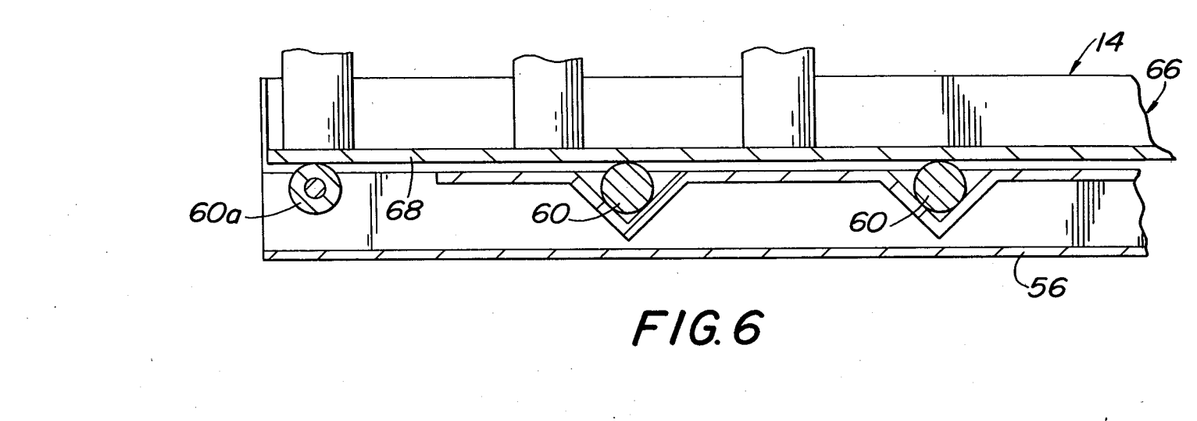
FIG. 6 is a sectional view taken along line 6—6 of FIG. 2.

Referring to FIGS. 2, 5 and 6, the movable cradle 14 includes elongate, longitudinally extending side members 66 of a generally L-shaped configuration. A horizontal leg 68 of each of the side members is supported by the longitudinally spaced-apart rollers 60 to provide low friction engagement between the cradle 14 and the supporting chassis.

As can be seen best in FIGS. 2 and 5, a vertical leg 70 of each of the L-shaped members 66 is closely adjacent a respective side wall 62, 64 of the chassis 12, and includes an opening in it which is aligned with an adjacent opening in each side walls 62 and 64 when the cradle 14 is in a fully retracted position of the chassis 12. In this regard the cradle 14 is provided with an L-shaped stop 75 adjacent its rear end for engaging a rear frame member of the chassis 12 when the cradle is fully retracted. A locking pin is inserted into the aligned openings adjacent each side of the trailer to positively lock the cradle 14 to the chassis 12. As with the earlier described locking pins, each of the locking pins 76 is connected to a link 77, that, in turn, is attached (e.g., by welding) to a surface of a respective side channel member 56 and 58 (FIG. 5).

Referring to FIGS. 2 and 5, the cradle 14 further includes a plurality of longitudinally spaced-apart, transversely extending cross-braces 80 which are welded to the side members 66 to provide a stable frame work of the cradle 14. An elongate longitudinally extending V-shaped guide 82 is centrally located between the side members 66 and is complimentary to the upwardly directed opening into the V-shaped track 63. Thus, the cradle 14 has a very stable mount on the chassis 12, in view of the close conformity of the side members 66 of the cradle to the side walls 62 and 64 of the chassis, and further in view of the cooperation between the V-shaped guide 82 of the cradle with the V-shaped track 63 of the chassis.

As can be seen in FIGS. 1, 2 and 5, a plurality of hull-supporting pads 84 form part of the cradle 14. These are secured to support members 86 that, in turn, are connected (e.g., by welding) to cross-braces 80. The pads 84 engage the hull of a boat to support said boat in a conventional manner.

As can be seen best in FIGS. 1 and 9 through 11, an extremely important feature of this invention resides in the fact that the cradle 14 has a forward section 90 which is inclined upwardly and forwardly relative to a rear horizontal section 92. It should be noted that it is the laterally extending legs 68 of the side members 66 in the rear horizontal section 92 that are supported on the longitudinally spaced-apart rollers 60.

Figure 8:
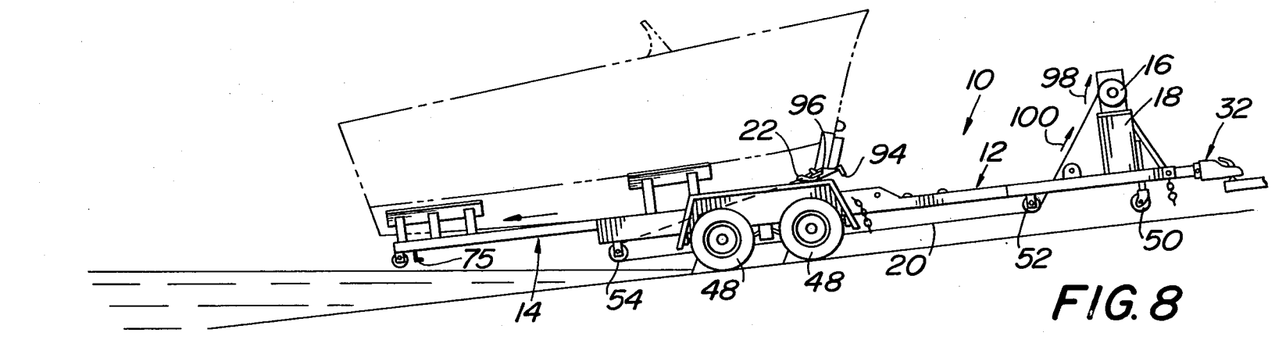
FIG. 8 is a side elevational view of the trailer of this invention with the parts thereof connected to extend the movable cradle for the purpose of launching a boat therefrom.

As can be seen in FIGS. 1, 7 and 8, a pair of retaining means, in the form of downwardly directed tabs 94 (only one of which is shown in the drawings) are located at the forward distal end of the forward section 90 of the cradle 14. Each tab constitutes an extension of a respective side member 66 of the cradle. In one embodiment the tab is welded onto the horizontal leg 68 of each of the side members 66.

Further associated with the cradle 14 is a clevis 96 (FIGS. 1 and 8) which is attached to the vertical leg 70 of one of the side members 66, perferably in the forward section 90 of said cradle. The clevis 96 cooperates with the hook 22 attached to the winch cable 20 to assist in positively forcing the cradle 14 rearwardly to launch a boat, when necessary.

Referring specifically to FIG. 8, the winch cable 20 is trained about the lower periphery of each of the rotatably mounted, longitudinally spaced-apart pulleys 52 and 54, and then is directed forwardly to a location where the hook 22 is attached to the clevis 96. Thus, as the winch is rotated in the direction of arrow 98 to wind in the cable 20, in the direction of arrow 100, the cradle 14 will be pulled rearwardly of the chassis to thereby direct a boat supported on the cradle into the water.

Progressive steps in launching the boat are illustrated in FIGS. 8 through 10. As the cradle 14 moves rearwardly to the locations illustrated in FIGS. 9 and 10, with the locking pin 40 out of engagement with the tongue 30 and the main body 36 of the chassis 12, the main body 36 of the chassis 12 tilts into a downwardly and rearwardly inclined orientation. This orientation assists in the launching operation.

As can be seen best in FIG. 9, when the upwardly and forwardly inclined section 90 of the cradle 14 reaches the rearmost end of the chassis 12, it begins to ride along the rear edge of the chassis, thereby causing the cradle to move in a rearward and downward direction. This is a very important feature in this invention, since it assists in both positioning the boat in the water, and in separating the cradle 14 from the boat after the boat has been launched. In other words, when the cradle 14 initially commences to extend rearwardly, it, along with the boat it supports, initially moves parallel to the upper surface of the main body 36 of the chassis, due to the face that the rear horizontal section 92 of the cradle is supported on the plurality of rollers 60 mounted on a corresponding horizontal section of the chassis 12. This generally horizontal movement of the cradle takes place up until the junction of the rear horizontal section 92 and the forward section 90 of the cradle is aligned with the rearmost end of the cradle 12. At this point in the extension of the cradle the majority of the boat will be overlying the water. To thereafter lower the boat into the water so that it can float outwardly from the supporting cradle 14, the cradle is continuously moved rearwardly, to cause the upwardly and forwardly inclined section 90 to ride downwardly along the rear edge of the chassis 12. This causes the cradle 14 to move downwardly into the water at the same time it is being extended.

When the cradle reaches its fully extended position the downwardly extending retaining means 94 adjacent each side of the cradle 14 will engage behind the rearmost rollers 60a located adjacent each side of the chassis 12, as is best illustrated in FIG. 7. In this manner the cradle 14 remains connected to the chassis without the use of any relatively removable latches, pins, etc. Thus, Applicant has devised an extremely simple and reliable system for maintaining the cradle 14 attached to the chasis, while at the same time establishing a highly desirable path of movement for the cradle.

Another very beneficial feature of this invention is that the same power winch 16 which is employed to launch the boat, also is employed to reposition the boat on the cradle 14 of the trailer 10, while at the same time telescopically moving the cradle forwardly onto the chassis 12. The structural arrangement of elements for permitting the winch 16 to be used in this manner will now be described with particular reference to FIGS. 2 and 11.

Referring first to FIG. 2, a rope 110, or other force transmitting member, is connected to the cradle 14 through a pair of clevises 112, each of which is attached adjacent a respective end of a cross brace 80 of the cradle. The rope is provided with a clasp 114 approximately medially thereof to provide a hook engaging loop 116, and opposed, inclined leg sections 118. These inclined leg sections generally conform to the shape of the bow of the boat, and actually are closely adjacent the bow when the boat is moved completely onto the cradle 14.

As can be seen best in FIG. 11, the hook 22 connected to the winch cable 20 is attached within the loop 116 for the purpose of pulling the cradle 14 onto the chassis 12. The second hook 24 is connected through a turnbuckle 120 to the hook 22, and this second hook is attached to a clevis 122 which commonly is provided adjacent the forward end of the boat. The turnbuckle is adjusted so that the major force provided to reposition the boat on the trailer is applied to the cradle 14, through the connection of the hook 22 to the rope 110. The hook 24 merely serves as a guide and holding member to assure that the boat follows along with the cradle as said cradle is moved forwardly onto the chassis 12.

Still referring to FIG. 11, in order to pull the cradle 14 onto the chassis 12, the winch 16 is powered to rotate in the same direction as it was rotated to launch the boat, i.e., in the direction of arrow 98. This continuously draws in the winch cable 20 to pull the cradle 14 onto the chassis 12.

Referring to FIG. 1, once the cradle 14 has been fully positioned back onto the chassis 12, the hook 24 is disengaged from the clevis 122, and the hook 22 is disengaged from the hook engaging loop 116 of the rope 110. Thereafter a hook 130, which is connected through a turnbuckle 132 to a clevis 134 on the chassis 12, is connected to the clevis 122 on the bow of the boat to firmly lock the boat in its stored position on the trailer 10. In addition, the locking pins 76 are inserted through the aligned openings in the chassis 12 and cradle 14 to positively lock the cradle on the chassis. This arrangement, which will positively lock the boat and cradle 14 on the chassis 12, is clearly shown in FIG. 1.

From the above description it should be apparent that the present invention possesses a number of advantages not achieved in the prior art devices. In particular, the design of the cradle 14 is such that it has an upward and forward inclination relative to a rear horizontal section thereof. Due to this arrangement, accompanied by the fact that the rear horizontal section 92 is supported on rollers 60 that also are aligned in the same generally horizontal plane as the section 92, provides a highly desired path of travel of the cradle 14 for the purpose of launching a boat. In particular, the initial movement of the cradle 14 is in a direction generally parallel to the main body 36 of the chassis to smoothly position the boat into a position partially overlying the water. Thereafter, movement of the forward inclined section 90 of the cradle along the rear edge of the chassis 12 will cause the cradle 14 to lower, thereby lowering the boat into the water and separating the boat from the cradle.

An additional advantage of the present invention is that when the cradle 14 has been fully extended, and also has reached its lowermost position for the purpose of launching the boat, the retaining means located at the forward distal end of the cradle will automatically engage behind the rearmost rollers 60 to positively retain the cradle on the chasis. This is accomplished in an extremely simple manner without the use of any relatively moving latches, pins, etc.

An additional advantage of the present invention is that only a single winch is employed for the purpose of launching and retrieving a boat, and there is no need to use any alternate or secondary winch to positively retain the boat on the trailer. Thus, only a single winch is included on the trailer 10 in the preferred construction.

A further advantage of this invention is that the hitch 32 is removeably mounted from the forward end of the tongue 30 in an extremely simple manner. Thus, when the trailer 10 is disconnected from its towing vehicle, it is a simple matter to remove the hitch, and theeby make it difficult for someone to steal the trailer.

Without further elaboration the foregoing will so fully illustrate my invention that others may, by applying current or future knowledge, adopt the same for use under various conditions of service.

What is claimed as the invention is:

1. An extendable boat trailer including:
   (a) a wheeled chassis adapted to be secured to a towing vehicle and having elongate, laterally spaced-apart side members;
   (b) a boat supporting cradle on said chassis and movable rearwardly and forwardly thereon;
   (c) said cradle including a rear section and a forward section, said forward section extending upwardly and forwardly relative to said rear section, and said rear section being movably supported on low friction conveyor means associated with said elongate side members of said chassis;
   (d) said low friction conveyor means including two sets of rollers, one of said sets being associated with one of said elongate side members of the chassis and the other set being associated with the other of said elongate side members of said chassis, a rear roller in each set being adjacent the rearward end of the chassis and constituting cradle-retaining means;
   (e) said forward section of the cradle including laterally spced-apart, downwardly directed retaining means thereon for engaging with the cradle-retaining means on said chassis when said cradle has been fully extended rearwardly on said chassis;
   (f) whereby rearward movement of said cradle results in a corresponding downward movement thereof as said forward section moves along a rear section of the chassis until the laterally spaced-apart retaining means on the forward section of the cradle engages the rear rollers on the chassis which constitute the retaining means adjacent the rearward end of the chassis.

2. The extendable boat trailer of claim 1 including only one winch having a winch cable with a on the free end thereof, said winch being attached to the chassis adjacent a forward end thereof, pulley means including a movable pulley adjacent a rear end of the chassis, said winch cable being movable toward the rear end of the chassis, about the movable pulley and toward the forward end of the chassis, said cradle including a first attachment member adjacent a forward end thereof for receiving the hook on the free end of the winch cable after it has been directed forwardly over the movable pulley, whereby movement of the winch to wind in the cable will cause the cradle to move rearwardly relatively to the chassis, said cradle further including a second attachment member, said hook being removable from said first attachment member and being attachable to said second attachment member for pulling the cradle forwardly onto the chassis when the winch is operated to wind in the winch cable.

3. The extendable boat trailer of claim 2 including a second hook attached to said winch cable for attachment to a boat on said cradle when the cradle is being pulled onto the chassis.

4. The extendable boat trailer of claim 1 wherein the chassis includes a forward tongue and a towing hitch removably attached to a forward end of said tongue.

5. The extendable boat trailer of claim 4 wherein said hitch includes a sleeve having openings in it aligned with openings in the tongue, and a pin removably receivable within said aligned openings for removably attaching the hitch to the tongue.

6. The extendable boat trailer of claim 2 further including a boat retaining member attached at one end to the chassis and removably attachable at an opposite end to a clevis on a forward end of a boat, whereby said member positively retains a boat on said cradle without employing the winch.

* * * * *